United States Patent [19]

Wang et al.

[11] Patent Number: 4,575,850
[45] Date of Patent: Mar. 11, 1986

[54] MULTILINE EMISSION INTEGRAL MIRROR LASER

[75] Inventors: Shing C. Wang, Temple City; William F. Hug, Pasadena, both of Calif.

[73] Assignee: Xerox Corporation, Stamford, Conn.

[21] Appl. No.: 187,107

[22] Filed: Sep. 15, 1980

Related U.S. Application Data

[63] Continuation of Ser. No. 680,559, Jan. 13, 1977.

[51] Int. Cl.$^4$ ............................................ H01S 3/10
[52] U.S. Cl. .................................... 372/23; 372/62; 372/68; 372/55
[58] Field of Search ................... 331/94.5 G, 94.5 D

[56] References Cited

U.S. PATENT DOCUMENTS 3,904,986  9/1975  Hernqvist ..................... 331/94.5 G

OTHER PUBLICATIONS

Hernqvist, Noblest of Metal-Vapor Lasers, Laser Focus, vol. 9, No. 9 (Sep. 1974) pp. 39 and 40.
Sabotinov et al, Mixed Gas Laser of the Three Basic Colours, Opto-Electronics, vol. 6 (1974), pp. 185-187.

*Primary Examiner*—William L. Sikes
*Assistant Examiner*—Léon Scott, Jr.
*Attorney, Agent, or Firm*—Franklyn C. Weiss

[57] ABSTRACT

An integral mirror type laser system which produces miltiline emissions simultaneously and which is adapted for use in optical data processing systems. In particular, in a first embodiment, a unitary positive column laser comprises two sections, the first section comprising a positive column helium-cadmium laser, the second section comprising a positive column helium-neon laser, the first and second sections being coaxially aligned and having different inner diameters. Simultaneous excitation in the two different sections provides optimum excitation for red laser light, produced by the helium-neon section and blue laser light produced by the helium-neon-cadmium section. The present system also allows separate cadmium vapor pressure control by separately controlling the vaporization temperature of the cadmium and also allows confinement of the cadmium vapor whereby the vapor does not contaminate one of the optical windows which confines the active laser medium. By proper selection of the optical cavity parameters, simultaneous red and blue laser oscillations can be obtained for application in any optical data processing system that requires a red and blue laser radiation source. In a second embodiment, the helium-cadmium section is replaced by with a helium-selenium section whereby the tandem laser system is capable of producing multiline laser radiation in the red, blue and green colors.

5 Claims, 2 Drawing Figures

MULTILINE EMISSION INTEGRAL MIRROR LASER

This is a continuation, of application Ser. No. 680,559, filed Jan. 13, 1977.

BACKGROUND OF THE INVENTION

The use of lasers in optical data processing systems such as facsimile devices, digital printers and the like have been disclosed in the prior art. A single laser which provides light of single wavelength may be generally utilized for scanning information on a document, the reflected radiation flux being electrically transferred to a storage device or utilized to reproduce the information as a copy of the original document. A scanning laser is generally utilized to reproduce the document information (or for printing purposes only). Typically, a helium-neon laser which generates red laser light when energized has been utilized in many scanning/reproducing applications. For example, Xerox Corporation, Stamford Conn., recently introduced a facsimile device, the Xerox Telecopier 200 (Xerox ® and Telecopier ® are registered trademarks of Xerox Corporation) which records on plain paper. The transceiver employs a low-energy helium-neon laser and uses the xerographic principle to receive and print messages on ordinary, unsensitized paper. Basically, when the transceiver is in the transmit mode, the laser provides a small stable beam of light to raster scan the original document. The reflected light is detected by a photosensor which translates the white and black of the document to electrical logic levels which may be transmitted by a phone line to a remote transceiver set to the receive mode. The receiver transceiver directs the laser beam onto a xerographic drum and by electrically modulating the laser with "1" and "0" logic levels in synchronism with the transmitter produces a copy of the original.

However, it would be desirable if a single laser could be provided to produce simultaneous laser radiation of more than one wavelength to allow the accurate reproductions of documents which contain information in other than black and white form, i.e. multicolored documents.

Although lasers have been produced in the prior art which are capable of producing multiline emissions simultaneously, such as an argon laser, these lasers are generally expensive and large in size, making them impractical for use in commercial systems, such as the Telecopier 200 transceiver described hereinabove.

An article in the Proceedings of the IEEE, *He-Ne-Cd Laser With Two Color Output*, S. A. Ahmed et al, November, 1969, pages 2084–2085, describes, inter alia, a helium-neon-cadmium laser which produces simultaneous lasing at 4416 Å and 6328 Å. However, the laser discharge essentially occurs through a single discharge tube of a single diameter making optimum/adjustment of the blue (4416 Å) and red (6328 Å) laser light extremely difficult.

Therefore, a simplified and relatively inexpensive laser which can produce multiline emissions simultaneously and which can be adapted for commercial utilization would satisfy an apparent need in optical data processing technology.

SUMMARY OF THE PRESENT INVENTION

The present invention provides an integral mirror type laser system which produces multiline emissions simultaneously and which is adapted for use in optical data processing systems. In particular, in a first embodiment, a unitary positive column laser comprises two sections, the first section comprising a positive column helium-cadmium laser, the second section comprising a positive column helium-neon laser, the first and second sections being coaxially aligned and having different inner diameters. Simultaneous excitation of each section provides optimum excitation for red laser light, produced by the helium-neon section, and blue laser light, produced by the helium-neon-cadmium section. The present system also allows separate cadmium vapor pressure control by separately controlling the vaporization temperature of the cadmium and also allows confinement of the cadmium vapor whereby the vapor does not contaminate one of the optical windows which confines the active laser medium. By proper selection of the optical cavity parameters, simultaneous red and blue laser oscillations can be obtained for application in any optical data processing system that requires a red and blue laser radiation source. In a second embodiment, the helium-cadmium section is replaced by with a helium-selenium section whereby the tandem laser system is capable of producing multiline laser radiation in the red, blue and green colors.

It is an object of the present invention to provide an integral mirror type laser system which is capable of producing multiline laser radiation.

It is a further object of the present invention to provide an integral mirror type laser system for producing multiline radiation, said system including positive column laser sections coaxially arranged and having different discharge bore diameters, each section having different active media incorporated therein.

It is still a further object of the present invention to provide an integral mirror type multiline laser device which incorporates two coaxially aligned positive column sections of different inner diameters, each section incorporating a different active medium therein, the active medium in the first section comprising a gas, the active medium in the second section comprising a gas mixture which includes a metal vapor.

It is still an object of the present invention to provide an integral mirror type laser system comprising two positive column sections coaxially arrange and having different discharge bore diameters for producing red and blue laser radiation in a first embodiment and red, blue and green in a second embodiment.

BRIEF DESCRIPTION OF THE DRAWINGS

For a better understanding of the invention as well as other objects and further features thereof, reference is made to the following description which is to be read in conjunction with the following wherein.

DESCRIPTION OF THE PREFERRED EMBODIMENTS

Figure 1:
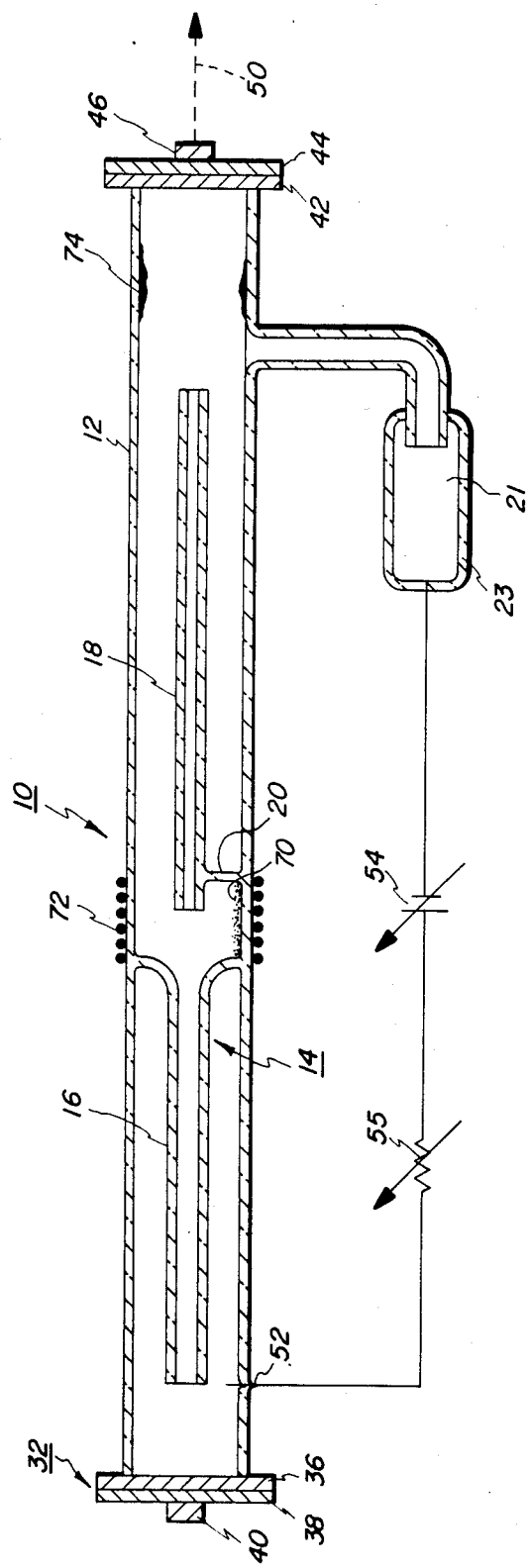
FIG. 1 shows a first embodiment of the present invention which simultaneously generates red and blue laser light.

Referring now to the figure, a first embodiment of the laser assembly 10 of the present invention is illustrated. Laser assembly 10 comprises an outer tube envelope 12, made of pyrex glass for example, and an inner capillary discharge tube 14. Capillary discharge tube 14 comprises two coaxially aligned positive column sections 16 and 18, each made of glass, section 16 including a flared end portion 20 which forms a reservoir 15 with support member 19 for the active laser medium, typically a metal. Capillary discharge tube 18 coaxially extends into the reservoir 15, as shown. A cathode electrode 21 is disposed in a side arm 23 of tube envelope 12. The outer tube envelope 12 has a typical diameter of 445 millimeters and a length of 60 centimeters (from mirror to mirror) whereas discharge tube section 16 has a typical length (including flared portion 20) of 20 centimeters, an inner diameter (non-flared portion) of 4 millimeters and an outer diameter (non-flared portion) of 7 millimeters. Discharge tube section 18 has a typical length of 20 centimeters and inner diameter of 1 millimeter and an outer diameter of 7 millimeters. The ends of tube envelope 12 are sealed by end mirror assemblies 32 and 34 as shown. The mirror assembly 32 comprises a metal flange 36 sealed to the tube envelope and an apertured metal flange 38 joined thereto. A fully reflecting mirror 40 may be sealed to metal flange 38 by standard techniques or by the technique described in copending application Ser. No. 552,396, filed Feb. 24, 1975. Mirror 40 typically comprises a glass substrate upon which is coated a reflecting layer comprising a plurality dielectric layers, the reflecting layer facing inward (within the tube envelope). End mirror assembly 34 comprises a metal flange 42 sealed to the tube envelope and an apertured metal flange 44 joined thereto. A partially transmissive mirror 46 is sealed to apertured flange 44 by standard techniques or in a manner as described in the aforementioned copending patent application. Mirror 46 comprises a glass substrate upon which is coated a partially transmissive layer of dielectric material, the transmissive layer being positioned within tube envelope 12. As will be set forth hereinafter, mirrors 40 and 46 are appropriately coated with layers of dielectric material such that only a laser beam 50 of a desired wavelength is transmitted by mirror 46, beam 50 being utilized by external apparatus such as for the scanning purposes as set forth hereinabove.

Anode pin 52 is inserted into the space within envelope 12 as shown and are glass sealed to the envelope using standard glass sealing techniques.

Variable voltage source 54 is connected between anode pin 52 and cathode 21 as shown.

In a first embodiment, a helium-neon gas mixture is filled within envelope 12 by standard techniques well known in the art, to a predetermined helium-neon total pressure. In a first embodiment, a few grams, typically 10 grams, of cadmium metal 70 is placed within reservoir 15 of envelope 12. A heater 72 may be provided to vaporize the cadmium to a preselected pressure as described hereinbelow.

Although laser assembly 10 functions as a single, unitary device, for purposes of explanation, both sections of the tube will be described separately. The left hand section of the assembly operates as a positive column helium-neon laser tube would operate. That is, the helium-neon gas is introduced into envelope 12 at a preselected pressure (helium at 3.0 Torr and neon at 0.3 Torr) and a discharge is initiated between anode pin 52 and cathode 24, by maintaining a voltage of approximately 1 Kv therebetween by adjusting source 54 and adjustable ballast resistor 55. Ballast resistor 55 functions to limit the laser tube discharge current. The electrical discharge (from anode 52, through tubes 16 and 18 and to cathode 21), excites the helium atoms to a metastable state which, due to inelastic collisions of the second kind, transfers energy to the neon atoms which are elevated to the population inversion state. The neon atoms, in falling to a lower energy state, emit a laser light of a frequency corresponding to the two different energy levels as is well known in the art. For helium-neon lasers, a red light of a wavelength of 6328 Å is generated.

A solid cadmium charge 70 is deposited in the right hand section of the laser assembly 10 prior to laser tube operation. Heater 72 is energized and the cadmium metal is vaporized, the preferred vapor pressure being attained by controlling the cadmium temperature. In particular, the cadmium temperature is maintained at approximately 280° C. by appropriate control of heater 72. Also confined within the section is gaseous helium and neon at a pressure as set forth hereinabove with reference to the left hand section. When a discharge is initiated between electrode 21 and anode pin 52 via voltage source 54 and ballast resistor 55, it excites the helium atoms to a metastable excited state from which energy is imparted to the vaporized cadmium atoms. This causes the cadmium atoms to ionize to an excited state required for lasing action. The ionized cadmium atoms are then transported along the length of the discharge confining bore tube 18 to cathode 21 via the process of cataphoresis in a manner well known in the art. When the excited ionized cadmium atoms return towards a lower energy state, laser radiation at 4416 Å (blue) is produced. The vapor cadmium condenses as condensate 74 due to the cooler tube operation at those regions of the tube as shown.

The gas mixture of helium and neon fills the entire laser tube structure. The cadmium vapor is distributed in capillary tube 18 near cathode 21 by cataphoretic pumping. Cataphoresis also confines the cadmium to the portion of the capillary tube 18 near cathode 21. Thus, the helium-neon gas mixture is the only active medium in capillary tube 16 adjacent anode 52 while the gas and vapor mixture of helium, neon and cadmium is the active medium in the portion of capillary tube 18 adjacent cathode 21. It should be noted that section 16, in addition to providing path for the helium-neon discharge, also provides for the cataphoretic confinement of the cadmium vapor atoms which may diffuse towards mirror 40. This prevents cadmium vapor from condensing on the reflecting surface of mirror 40. The discharge current, in essence, forms a continuous filament passing through both capillary tubes 16 and 18. The inner diameter of capillary tube 16 adjacent anode 52 is chosen to optimize the 6328 Å output resulting from the excitation reaction of the discharge on the helium-neon gas, the diameter (in millimeters) being approximately equal to $i_0/10$ wherein $i_0$ is the discharge current in milliamps (ma). Typically, $i_0$ is selected to be 40 ma providing an inner diameter of 4 millimeters. The inner diameter of the capillary tube near cathode 21 is chosen to optimize the 4416 Å output resulting from the helium-neon-cadmium discharge and is equal to $i_0/40$. For an $i_0$ of 40 ma, the diameter is therefor 1 millimeter.

The use of two coaxial discharge tubes having different inner diameters selected to optimize the output therefrom allows the output laser beam 50 to be correspondingly optimized for external utilization.

In summary, after the discharge is initiated and the cadmium vaporized, voltage source 54 causes lasing action to occur. The left hand section in essence provides red laser light, the right hand section in essence providing the blue laser light component of light beam 50 notwithstanding the presence of helium-neon gas therein (helium-cadmium interaction predominates over the helium-neon interaction).

The dielectric coatings on integral mirrors 40 and 46 are selected so that only red and blue light (combined in one beam) is transmitted by mirror 46 as beam 50. Typical dielectric coatings include alternate layers of titanium and silicon dioxide, each layer having a predetermined thickness.

It should be noted that the temperature applied to the cadmium charge 70 determines its vapor pressure (and thus the intensity of the light produced) the cadmium pressure essentially not being affected by the helium-neon pressure.

Although not shown in FIG. 1, the simultaneous generation of red and blue light as a single beam 50 can be dispersed into its separate component colors by using a prism or appropriate light filters.

Figure 2:
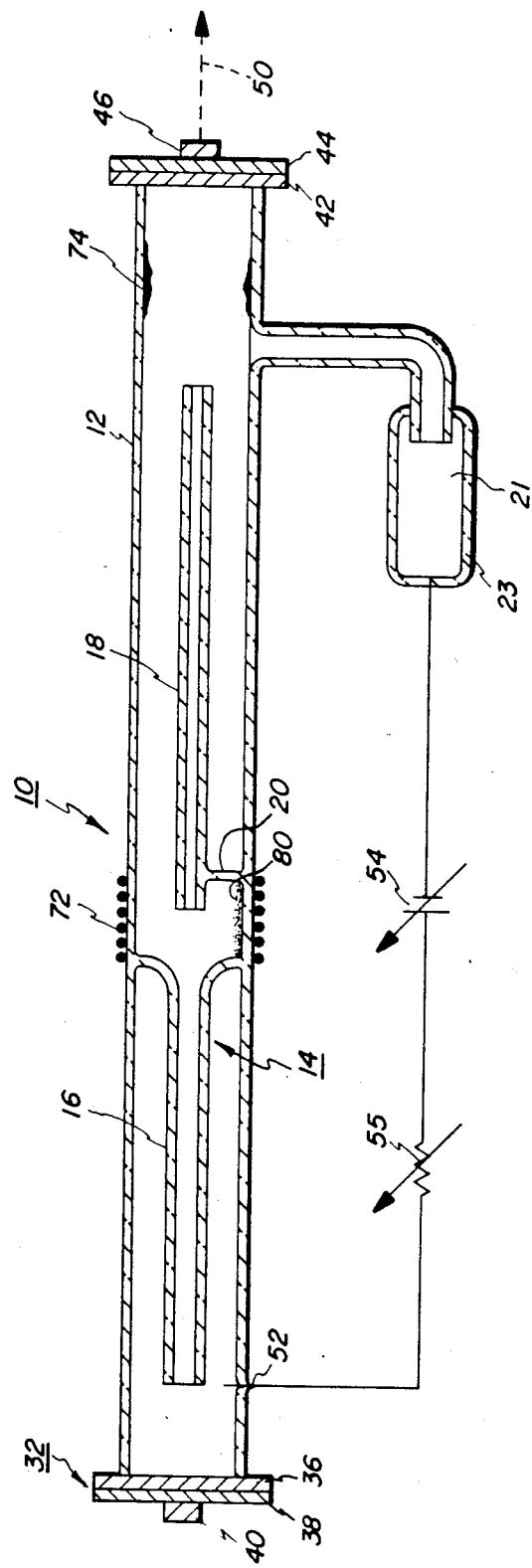
FIG. 2 shows a second embodiment of the present invention which simultaneously generates red, green and blue (white) laser light.

Referring now to FIG. 2, a second embodiment of the present invention is illustrated. The embodiment shown is substantially identical to that shown in FIG. 1, the only difference being a charge of selenium metal 80 is utilized in the right hand section instead of cadmium. Selenium vapor, when maintained at a predetermined temperature of approximately 270° C. by heater 72 interacts with the helium-neon gas wherein the helium ions and/or metastable atms causes the selenium atoms to be positively ionized and excited to a higher energy state. When the excited selenium atoms return to its initial or ground state, multiline emissions, including blue and green laser light is produced. The blue and green laser light emissions include the following wavelengths: 4604 Å (blue), 4976 Å (blue-green), 5069 Å (green), 5176 Å (green), and 5306 Å (green). The confinement of the selenium vapor is identical to the process described with reference to FIG. 1 hereinabove and the inner diameters of capaillary discharge tube sections 16 and 18 are substantially identical to the helium-cadmium embodiment described with reference to FIG. 1. The laser mirrors, in this embodiment, are coated for broadband reflectance (from about 4800 Å to about 6500 Å).

In operation, after vaporizing the selenium to the appropriate vapor pressure and initiating the discharge in both sections, voltage source 54 and ballast resistor 55 act to maintain the discharge for lasing action, red, blue and green (white) light being simultaneously transmitted as beam 50. As set forth hereinabove with reference to FIG. 1, the separate color components of beam 50 can be obtained if desired by utilizing a prism to disperse each color component or by providing appropriate color filters.

The laser assembly described with reference to FIGS. 1 and 2 hereinabove provides a multiline laser source for many applications, such as laser scanning as described hereinabove.

The laser structure described hereinabove is simple, compact and low cost, the low cost feature arising from the fact that only one set of laser mirrors, one power supply and one unitary structure are necessary. Further, no alignment fixturing is required to ensure coaxiality of the multiple color laser beams.

While the invention has been described with reference to its preferred embodiment, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. In a laser discharge tube enclosing first and second different active lasing mediums for producing an output laser beam having a plurality of wavelengths, the improvement comprising:

a tube envelope enclosing said first and second different active lasing mediums, said tube envelope enclosing end members for hermetically sealing said envelope;

a first discharge tube having an inner diameter and supported within said envelope;

a second discharge tube having an inner diameter and supported within said envelope and spaced apart from and coaxially aligned with said first discharge tube, said first and second discharge tubes being operative to produce said output laser beam;

a first electrode positioned adjacent one end of said first discharge tube;

a second electrode positioned adjacent one end of said second discharge tube; and means for applying an electrostatic potential between said first and second electrodes of a potential to maintain the same discharge current between said electrodes through said first and second discharge tubes whereby said first active lasing medium produces in said first discharge tube a first laser beam of at least one wavelength and said active lasing medium producing in said discharge tube a second laser beam of at least one wavelength, said second laser beam being of a different wavelength than said first laser beam, said first and second laser beams being combined simultaneously into a laser output beam having a plurality of wavelengths, the inner diameters of said first and second discharge tubes being different and selected to optimize the output of said first and second laser beams.

2. The laser discharge tube as defined in claim 1 wherein said first active lasing medium comprises a gas and said second active lasing medium comprises a vaporized metal.

3. The laser discharge tube as defined in claim 2 wherein said gas comprises a mixture of helium and neon and said metal comprises cadmium, said first laser beam comprising red laser light and said second laser beam comprising blue laser light.

4. The laser discharge tube as defined in claim 2 wherein said gas comprises a mixture of helium and neon gas and said metal comprises selenium, said first laser beam comprising red laser light and said second laser beam comprising blue and green laser light.

5. The laser discharge tube as defined in claim 1 wherein said end members comprise optical mirrors sealed to an apertured flange member, said apertured flange member being affixed to the ends of said tube envelope, one of said optical mirrors being reflective of said first and second laser beams and the other said optical mirrors partially transmitting said first and second laser beams simultaneously as said combined laser output beam.

* * * * *